US009329435B2

United States Patent
Park et al.

(10) Patent No.: US 9,329,435 B2
(45) Date of Patent: May 3, 2016

(54) DISPLAY PANEL AND METHOD OF MANUFACTURING THE SAME

(71) Applicant: Samsung Display Co., Ltd., Yongin-si, Gyeonggi-do (KR)

(72) Inventors: Jae Hwa Park, Yongin (KR); Swae-Hyun Kim, Yongin (CN); Seung Jun Yu, Yongin (KR); Sang-Myoung Lee, Yongin (KR); Hyunggi Jung, Yongin (KR); Kipyo Hong, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 46 days.

(21) Appl. No.: 14/200,416

(22) Filed: Mar. 7, 2014

(65) Prior Publication Data

US 2015/0062512 A1 Mar. 5, 2015

(30) Foreign Application Priority Data

Sep. 3, 2013 (KR) .................. 10-2013-0105603

(51) Int. Cl.
*G02F 1/1337* (2006.01)
*G02F 1/1335* (2006.01)
*G02F 1/1339* (2006.01)

(52) U.S. Cl.
CPC ............ *G02F 1/1337* (2013.01); *G02F 1/1339* (2013.01); *G02F 1/133514* (2013.01)

(58) Field of Classification Search
CPC   G02F 1/1339; G02F 1/1337; G02F 1/133514
See application file for complete search history.

(56) References Cited

U.S. PATENT DOCUMENTS

| 2004/0174476 A1* | 9/2004 | Yeh .................. G02F 1/133512 349/110 |
| 2006/0267969 A1 | 11/2006 | Doi et al. |
| 2009/0147188 A1 | 6/2009 | Yang et al. |
| 2012/0248444 A1 | 10/2012 | Kang et al. |
| 2015/0192816 A1* | 7/2015 | Shih ...................... G02F 1/1339 349/42 |

FOREIGN PATENT DOCUMENTS

JP  2009-244301  10/2009
KR  10-2007-0050722  5/2007

OTHER PUBLICATIONS

Liimatainen, et al., "Controlling Liquid Spreading Using Microfabricated Undercut Edges", www.materialsviews.com, www.advmat.de, Advanced Materials, 2013, 25, Wiley-VCH Verlag GmbH & Co. KGaA, Weinheim, pp. 2275-2278.

* cited by examiner

*Primary Examiner* — James Dudek
(74) *Attorney, Agent, or Firm* — Knobbe Martens Olson & Bear LLP

(57) ABSTRACT

A display panel includes a first display substrate, a second display substrate facing the first display substrate and being coupled to the first display substrate, a liquid crystal layer interposed between the first display substrate and the second display substrate, an alignment layer disposed in a display area of at least one of the first and second display substrates, and a partition wall disposed in a peripheral area surrounding the display area of the first or second display substrate. The partition wall includes a body and a capping layer that covers an upper surface of the body. A width of the upper surface of the body is smaller than a width of the capping layer disposed on the body.

9 Claims, 10 Drawing Sheets

DISPLAY PANEL AND METHOD OF MANUFACTURING THE SAME

CROSS-REFERENCE TO RELATED APPLICATIONS

This U.S. non-provisional patent application claims priority to Korean Patent Application No. 10-2013-0105603, filed on Sep. 3, 2013 at the Korean Patent Office, the contents of which are hereby incorporated by reference in their entirety.

BACKGROUND

1. Field

The present disclosure relates to a display panel capable of preventing an alignment solution from spreading out when an alignment layer is formed, and a method of manufacturing the display panel.

2. Description of the Related Technology

In general, a liquid crystal display device includes a thin film transistor substrate, a color filter substrate, and a liquid crystal layer interposed between the thin film transistor substrate and the color filter substrate.

The thin film transistor substrate includes pixels to display an image. Each pixel includes a gate line, a data line, a thin film transistor, and a pixel electrode. The gate line and the data line respectively receive a gate signal and a data signal and are electrically connected to a gate electrode and a source electrode, respectively. The pixel electrode is electrically connected to a drain electrode of the thin film transistor.

SUMMARY OF CERTAIN INVENTIVE ASPECTS

The present disclosure provides a display panel capable of preventing an alignment solution from spreading out to improve reliability thereof.

The present disclosure provides a method of manufacturing the display panel.

Embodiments provide a display panel including a first display substrate, a second display substrate facing the first display substrate and being coupled to the first display substrate, a liquid crystal layer interposed between the first display substrate and the second display substrate, an alignment layer disposed in a display area of at least one of the first and second display substrates, and a partition wall disposed in a peripheral area surrounding the display area of the at least one display substrate.

The partition wall includes a body and a capping layer that covers an upper surface of the body, and a width of the upper surface of the body is smaller than a width of the capping layer disposed on the body.

Embodiments provide a method of manufacturing a display panel, including forming a first display substrate, forming a second display substrate facing the first display substrate and being coupled to the first display substrate, forming a liquid crystal layer between the first display substrate and the second display substrate, forming an alignment layer disposed in a display area of at least one of the first and second display substrates, and forming a partition wall disposed in a peripheral area surrounding the display area of the at least one of the first and second display substrates.

Forming the partition wall includes forming a body on the at least one of the first and second display substrates and forming a capping layer to cover an upper surface of the body. A width of the upper surface of the body is smaller than a width of the capping layer.

According to the above, the undercut is formed at the side portion of the partition wall to control the surface contact angle of the partition wall. Therefore, the alignment solution may be prevented from spreading out across the surface of the partition wall.

Thus, although the alignment layer is formed by an inkjet method, defects caused by the spreading out of the alignment solution may be prevented, and thus the reliability of the display panel may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF CERTAIN INVENTIVE EMBODIMENTS

Figure 1:
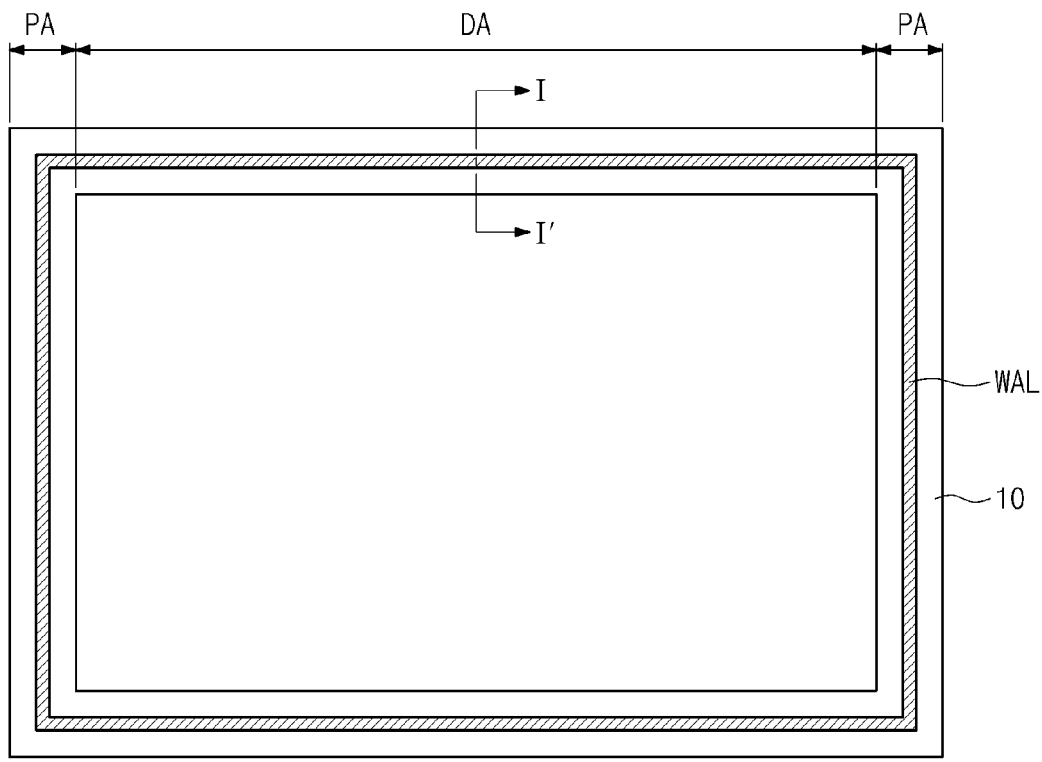
FIG. 1 is a plan view showing a display substrate according to an embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals generally refer to like elements throughout. As used herein, the term "and/or" includes any and all combinations of one or more of the associated listed items.

It will be understood that, although the terms first, second, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In a display panel, the thin film transistor substrate faces the color filter substrate and is coupled to the color filter substrate, and a liquid crystal is injected into a space between the thin film transistor substrate and the color filter substrate, which is secured by a spacer. To align the liquid crystal, an alignment process is performed to form an alignment layer on the thin film transistor substrate and the color filter substrate. The alignment layer is formed by coating an alignment solution on a substrate and drying the alignment solution.

However, the alignment solution spreads out across an area in which the alignment solution is coated due to spreadability of the liquid state. When the alignment solution spreads out, the alignment layer overlaps with a seal and a coupling force between the thin film transistor substrate and the color filter substrate becomes weak and a vapor permeability of the display panel is increased due to the overlap between the alignment layer and the seal. As a result, a reliability of the display panel decreases.

Hereinafter, the present invention will be explained in detail with reference to the accompanying drawings.

Figure 2:
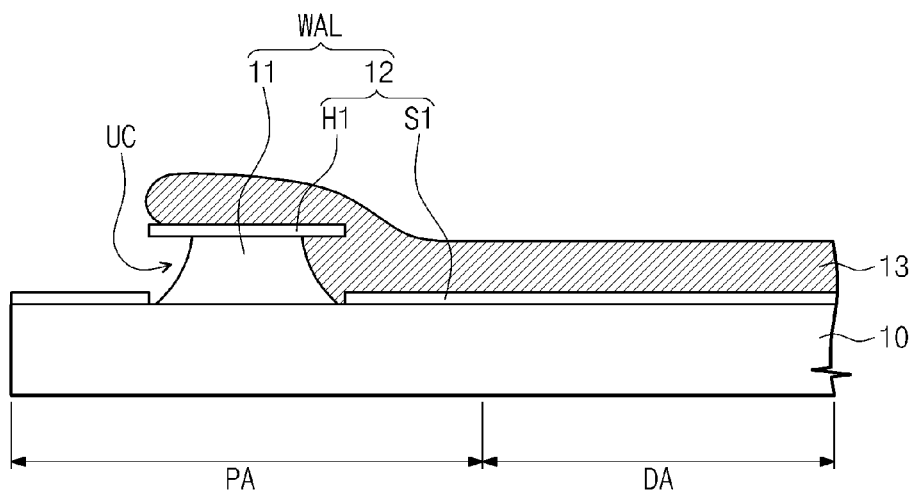
FIG. 2 is a cross-sectional view taken along a line I-I' shown in FIG. 1.

FIG. 1 is a plan view showing a display substrate according to an embodiment of the present disclosure and FIG. 2 is a cross-sectional view taken along a line I-I' shown in FIG. 1.

Referring to FIG. 1, a display substrate 10 includes a display area DA and a peripheral area PA disposed adjacent to the display area DA. The display area DA displays an image when the display substrate 10 is applied to a display panel. The peripheral area PA is disposed to surround the display area DA and serves as a light blocking area to block light traveling thereto.

The display substrate 10 includes a partition wall WAL disposed in the peripheral area PA. The partition wall WAL is disposed along the peripheral area PA to have a closed loop shape. As shown in FIG. 2, the partition wall WAL is prepared to prevent an alignment solution from spreading out when an alignment layer is formed on the display substrate 10.

As an example, the partition wall WAL includes a body 11 and a capping layer 12 that covers an upper surface of the body 10 and an undercut UC is formed at a side portion of the body 11, and thus a width of the capping layer 12 is larger than a width of the upper surface of the body 11. In one embodiment, the capping layer 12 is protruded outward than the upper surface of the body 11 by about 2 micrometers. The capping layer 12 may be designed to have a width larger than that of the upper surface of the body 11 in a range of about 2 micrometers. When the width of the protruded portion of the capping layer 12 is larger than about 2 micrometers, the capping layer 12 may be collapsed in the area in which the undercut UC is formed.

The capping layer 12 is removed in the area in which the undercut UC is formed. As an example, the capping layer 12 is configured to include a holding part H1 that covers the upper surface of the body 11 and holds the alignment solution on the body 11, and a stacking part Si that covers the display substrate 10 with reference to the area in which the undercut UC is formed. The holding part H1 and the stacking part S1 are disconnected from each other in the area in which the undercut UC is formed. The capping layer 12 may include, for example, silicon nitride (SiNx) or silicon oxide (SiOx).

Figure 3:
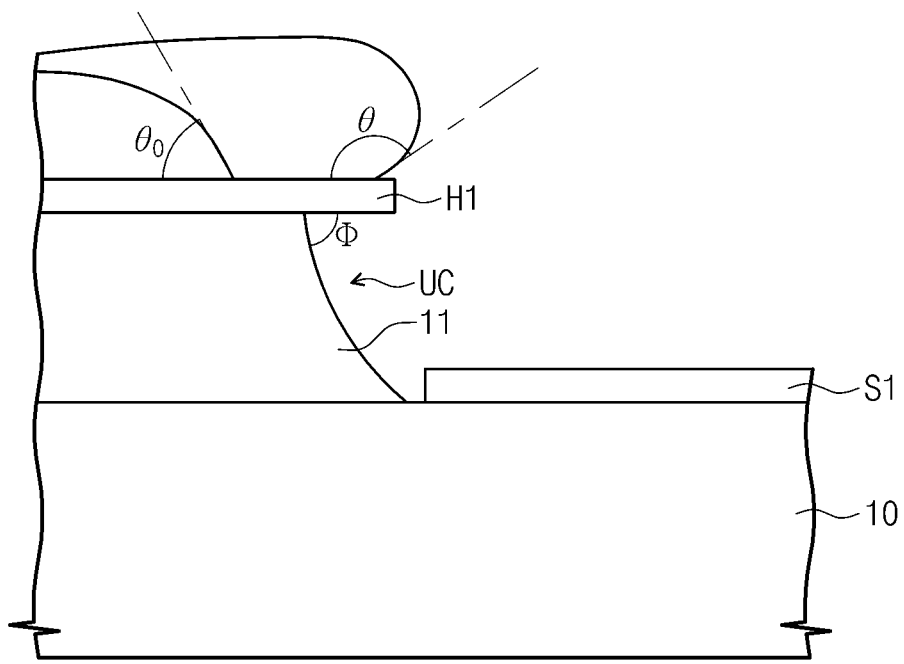
FIG. 3 is a view showing a contact angle between a partition wall and an alignment solution.

FIG. 3 is a view showing a contact angle between a partition wall and an alignment solution.

Referring to FIG. 3, a surface contact angle θ of the alignment solution 13 on the partition wall WAL satisfies the following Equation.

$$\theta_0 \leq \theta \leq (180° - \phi) + \theta_0 \quad \text{Equation}$$

In Equation, $\theta_0$ denotes the surface contact angle (hereinafter, referred to as initial surface contact angle) of the alignment solution on a flat plate and $\Phi$ denotes an included angle between the holding part H1 and the side portion of the body 11 of the capping layer 12, which is caused by the undercut UC.

The alignment solution 13 has the initial surface contact angle of $\theta_0$ on the flat plate, but the surface contact angle θ of the alignment solution 13 is changed on the capping layer 12 disposed on the body 11 since the undercut UC is formed at the side portion of the body 11. The surface contact angle θ of the alignment solution 13 increases from the initial surface contact angle $\theta_0$ on the partition wall WAL due to the undercut UC. The increase of the surface contact angle θ is varied depending on the included angle $\Phi$ between the holding part H1 and the side portion of the body 11 of the capping layer 12.

The increase of the surface contact angle θ of the alignment solution 13 on the partition wall WAL means that a surface tension of the partition wall WAL increases. Therefore, the partition wall WAL may hold the alignment solution 13 and prevent the alignment solution 13 from spreading out.

Figure 4:
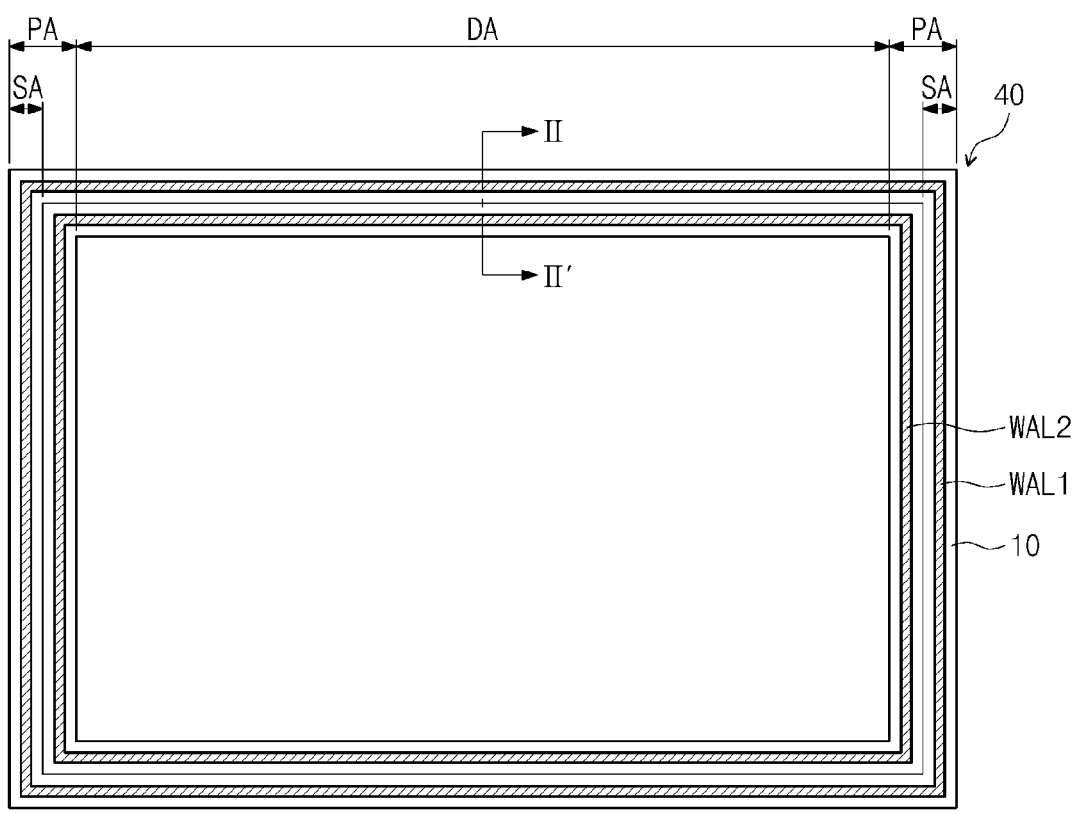
FIG. 4 is a plan view showing a display panel according to an embodiment of the present disclosure.
Figure 5:
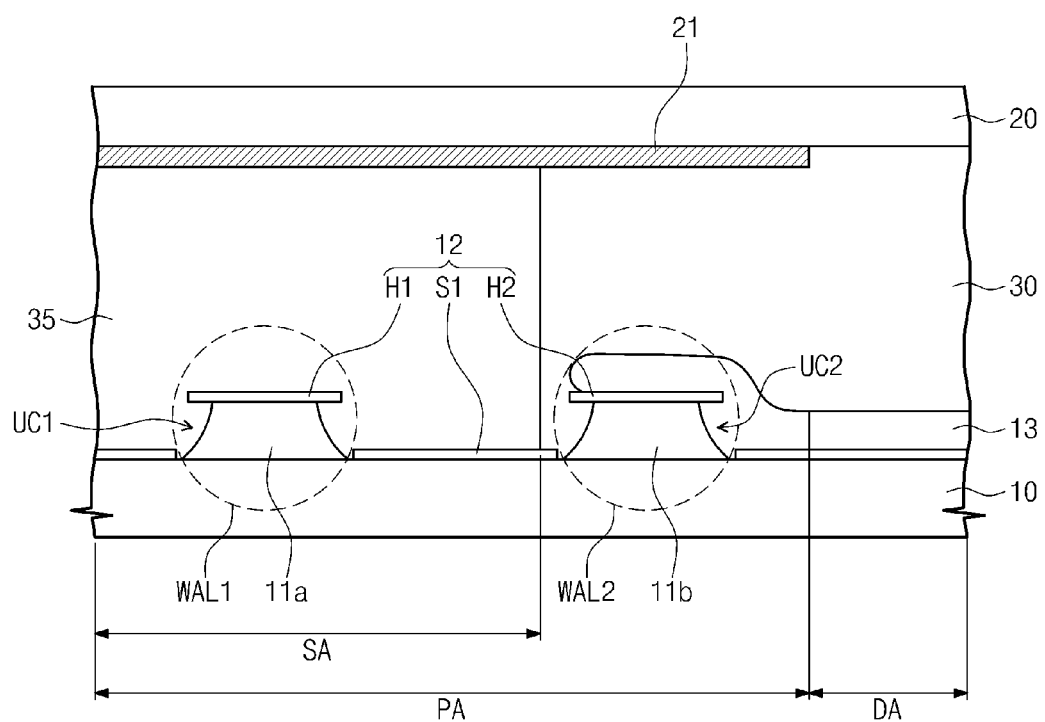
FIG. 5 is a cross-sectional view taken along a line II-II' shown in FIG. 4.

FIG. 4 is a plan view showing a display panel according to an embodiment of the present disclosure and FIG. 5 is a cross-sectional view taken along a line II-II' shown in FIG. 4. In FIGS. 4 and 5, the same reference numerals denote the same elements in FIGS. 1 and 2, and thus detailed descriptions of the same elements will be omitted.

Referring to FIGS. 4 and 5, a display panel 40 includes a first display substrate 10, a second display substrate 20 facing the first display substrate 10, and a liquid crystal layer 30 interposed between the first display substrate 10 and the second display substrate 20.

The display panel 40 further includes a seal 35 to couple the first display substrate 10 and the second display substrate 20. The display panel 40 includes a display area DA and a peripheral area PA, and the peripheral area PA includes a sealing area SA in which the seal 35 is formed. The second display substrate 20 may include a light blocking layer 21 formed thereon to block light leaking from the peripheral area PA.

First and second partition walls WAL1 and WAL2 are disposed on the first display substrate 10. Although not shown in FIG. 5, the first and second partition walls WAL1 and WAL2 may be disposed on the second display substrate 20 or respectively disposed on the first and second display substrates 10 and 20.

The first partition wall WAL1 includes a first body 11a disposed in the sealing area SA and a first holding part H1 that covers an upper surface (hereinafter, referred to as first upper surface) of the first body 11a, and the second partition wall WAL2 includes a second body 11b disposed between the sealing area SA and the display area DA and a second holding part H2 that covers an upper surface (hereinafter, referred to as second upper surface) of the second body 11b.

A first undercut UC1 is formed at a side portion of the first body 11a such that the first upper surface has a width smaller than that of the first holding part H1, and a second undercut UC2 is formed at a side portion of the second body 11b such that the second upper surface has a width smaller than that of the second holding part H2.

The capping layer 12 includes the first and second holding parts H1 and H2 that respectively cover the first and second upper surfaces and a stacking part S1 that covers the first display substrate 10. The capping layer 12 is removed in the areas in which the first and second undercuts UC1 and UC2 are formed. Thus, the first and second holding parts H1 and H2 are disconnected from the stacking part S1.

Each of the first and second partition walls WAL1 and WAL2 is disposed along an edge of the display panel 40 to have a closed loop shape and prevents the alignment solution 13 from spreading out. In addition, the second partition wall WAL2 disposed between the first partition wall WAL1 and the display area DA prevents the alignment solution 13 that spreads out through the second partition wall WAL2 from entering again into the display area DA.

Figure 6:
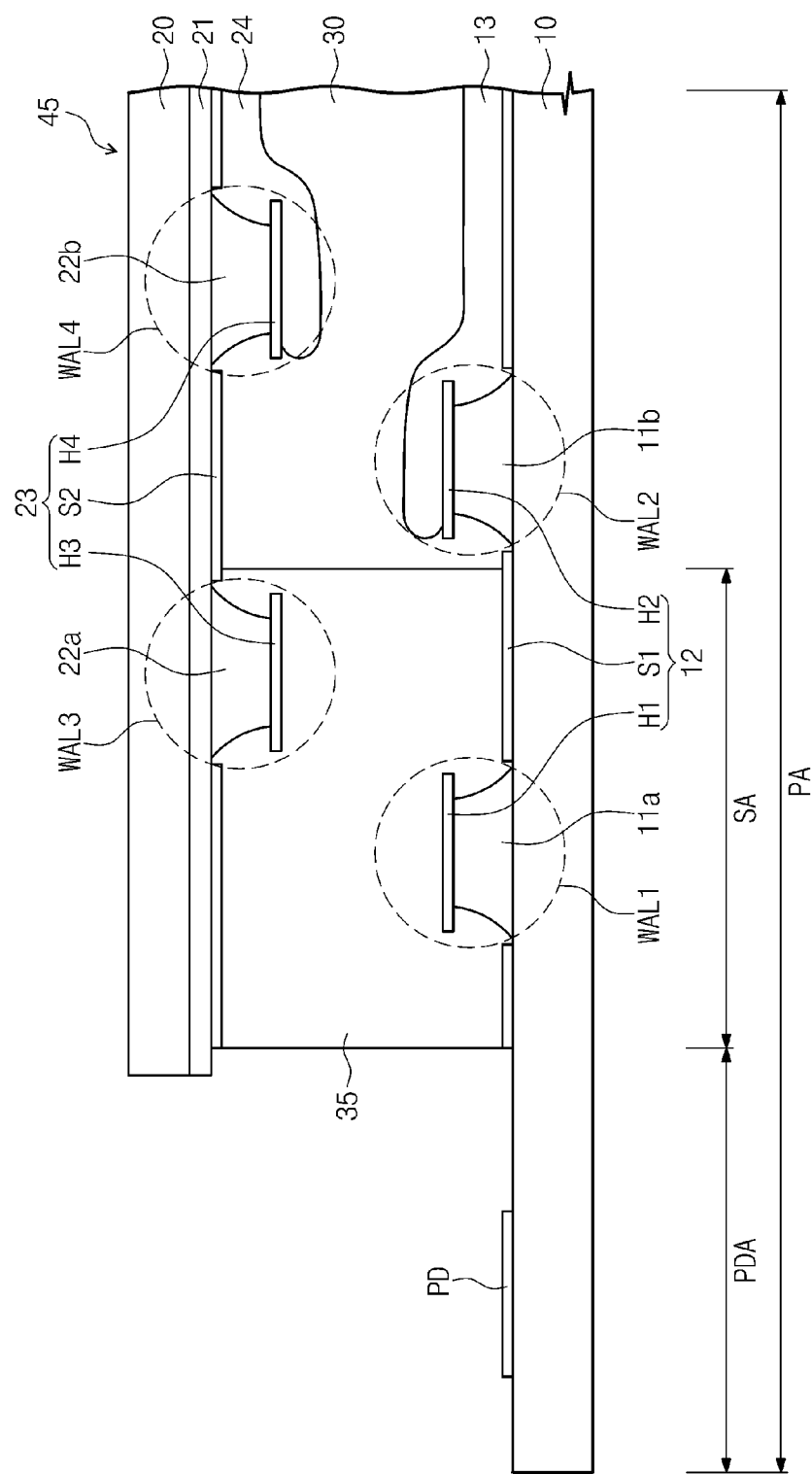
FIG. 6 is a cross-sectional view showing a display panel according to an embodiment of the present disclosure.

FIG. 6 is a cross-sectional view showing a display panel according to an embodiment of the present disclosure.

Referring to FIG. 6, a display panel 45 includes a first display substrate 10, a second display substrate 20 facing the first display substrate 10, a liquid crystal layer 30 interposed between the first display substrate 10 and the second display substrate 20, and a seal 35 to couple the first display substrate 10 and the second display substrate 20.

The display panel 45 includes a lower partition wall disposed on the first display substrate 10 and an upper partition wall disposed on the second display substrate 20. The lower partition wall prevents a first alignment solution 13, which is coated on the first display substrate 10 by an inkjet method, from spreading out of the display panel 45, and the upper partition wall prevents a second alignment solution 24, which is coated on the second display substrate 20 by an inkjet method, from spreading out of the display panel 45.

As an example, the lower partition wall includes a first partition wall WAL1 disposed in the sealing area SA and a second partition wall WAL2 disposed inward than the sealing area SA, and the upper partition wall includes a third partition wall WAL3 disposed in the sealing area SA and a fourth partition wall WAL4 disposed inward than the sealing area SA.

The first and second partition walls WAL1 and WAL2 are disposed to be dislocated with respect to the third and fourth partition walls WAL3 and WAL4. Although not shown in figures, when the third and fourth partition walls WAL3 and WAL4 are formed in a column spacer shape and the first and second partition walls WAL1 and WAL2 are disposed to face the third and fourth partition walls WAL3 and WAL4, a cell gap in the edge portion of the display panel 45 may be larger than that of the center portion of the display panel 45. Accordingly, the first and second partition walls WAL1 and WAL2 are disposed to be dislocated with respect to the third and fourth partition walls WAL3 and WAL4.

However, when a sum of heights of the first and third partition walls WAL1 and WAL3 and a sum of heights of the second and fourth partition walls WAL2 and WAL4 are smaller than the cell gap, and the heights of the first to fourth partition walls WAL1 to WAL4 do not exert any influence on the cell gap, the first and second partition walls WAL1 and WAL2 may be disposed to face the third and fourth partition walls WAL3 and WAL4, respectively.

As shown in FIG. 6, the peripheral area PA of the display panel 45 includes a pad PD disposed in a pad area PDA of the first display substrate 10, which is not overlapped with the second display substrate 20, to receive signals from an external source (not shown). The pad PD may be a gate pad to apply a gate signal to the display area DA or a data pad to apply a data signal to the display area DA.

The first partition wall WAL1 includes a first body 11a disposed in the sealing area SA and a first holding part H1 that covers an upper surface (hereinafter, referred to as first upper surface) of the first body 11a, and the second partition wall WAL2 includes a second body 11b disposed between the sealing area SA and the display area DA and a second holding part H2 that covers an upper surface (hereinafter, referred to as second upper surface) of the second body 11b.

A first undercut UC1 is formed at a side portion of the first body 11a such that the first upper surface has a width smaller than that of the first holding part H1, and a second undercut UC2 is formed at a side portion of the second body 11b such that the second upper surface has a width smaller than that of the second holding part H2.

When the first and second undercuts UC1 and UC2 are respectively formed at the side portions of the first and second bodies 11a and 11b, the surface contact angle θ of the first alignment solution 13 increases than the initial surface contact angle on the first and second holding parts H1 and H2 disposed on the first and second bodies 11a and 11b. Consequently, the surface tension of the upper surfaces of the first and second partition walls WAL1 and WAL2 increases and the first alignment solution 13 is held on the upper surface of the upper surfaces of the first and second partition walls WAL1 and WAL2, thereby preventing the first alignment solution 13 from spreading out.

The third partition wall WAL3 includes a third body 22a disposed in the sealing area SA, and a third holding part H3 that covers an upper surface (hereinafter, referred to as third upper surface) of the third body 22a, and the fourth partition wall WAL4 includes a fourth body 22b disposed between the sealing area SA and the display area DA, and a fourth holding part H4 that covers an upper surface (hereinafter, referred to as fourth upper surface) of the fourth body 22b.

A third undercut UC3 is formed at a side portion of the third body 22a such that the first upper surface has a width smaller than that of the third holding part H3, and a fourth undercut UC4 is formed at a side portion of the fourth body 22b such that the second upper surface has a width smaller than that of the fourth holding part H4.

When the third and fourth undercuts UC3 and UC4 are respectively formed at the side portions of the third and fourth bodies 22a and 22b, the surface contact angle θ of the second alignment solution 24 increases from the initial surface contact angle $θ_0$ on the third and fourth holding parts H3 and H4 disposed on the third and fourth bodies 22a and 22b. Consequently, the surface tension of the upper surfaces of the third and fourth partition walls WAL3 and WAL4 increases, and the second alignment solution 24 is held on the upper surface of the upper surfaces of the third and fourth partition walls WAL3 and WAL4, thereby preventing the second alignment solution 24 from spreading out.

The first and second partition walls WAL1 and WAL2 are formed to prevent the first alignment solution 13 from spreading out on the first display substrate 10. In addition, the second partition wall WAL2 disposed between the first partition wall WAL1 and the display area DA prevents the first alignment solution 13 that spreads out through the second partition wall WAL2 from entering again into the display area DA.

The third and fourth partition walls WAL3 and WAL4 are formed to prevent the second alignment solution 24 from spreading out on the second display substrate 20. In addition, the fourth partition wall WAL4 disposed between the third partition wall WAL3 and the display area DA prevents the second alignment solution 24 that spreads out through the fourth partition wall WAL4 from entering again into the display area DA.

Figure 7:
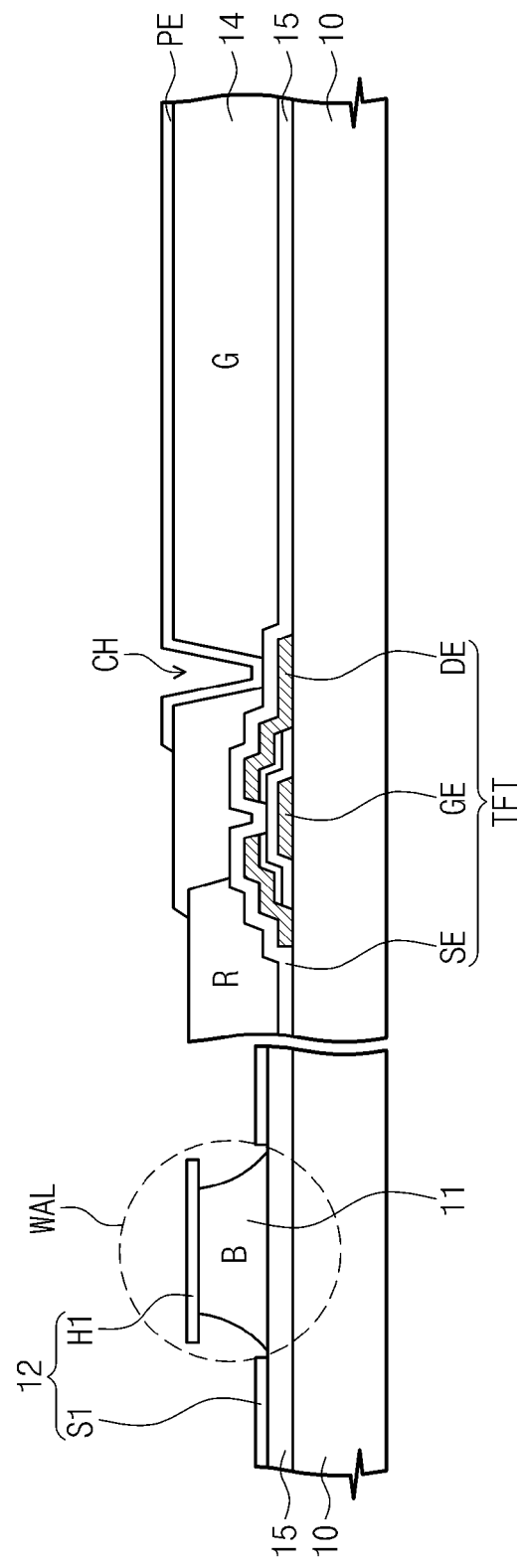
FIG. 7 is a cross-sectional view showing a first display substrate according to an embodiment of the present disclosure.

FIG. 7 is a cross-sectional view showing a first display substrate according to an embodiment of the present disclosure.

Referring to FIG. 7, the first display substrate 10 includes a thin film transistor TFT, a pixel electrode PE, and a color filter layer 14, which are disposed to correspond to the display area. The thin film transistor TFT includes a gate electrode GE, a source electrode SE, and a drain electrode DE, and the pixel electrode PE is electrically connected to the drain electrode DE.

The color filter layer 14 includes red, green, and blue color pixels R, G, and B and disposed on a protective layer 15 that covers the thin film transistor TFT. As an example, the protective layer 15 includes an inorganic insulating layer, and the protective layer 15 and the color filter layer 14 are provided with a contact hole CH formed therethrough to expose the drain electrode DE. The pixel electrode PE is disposed on the color filter layer 14 and directly makes contact with the drain electrode DE through the contact hole CH.

A partition wall WAL is disposed on the first display substrate 10 to correspond to the peripheral area. The partition wall WAL includes a body 11 including the blue color pixel B of the color filter layer 14, and a holding part H1 that covers an upper surface of the body 11. As an example, the body 11 is configured to include the blue color pixel B but it should not be limited to the blue color pixel B.

Figure 8:
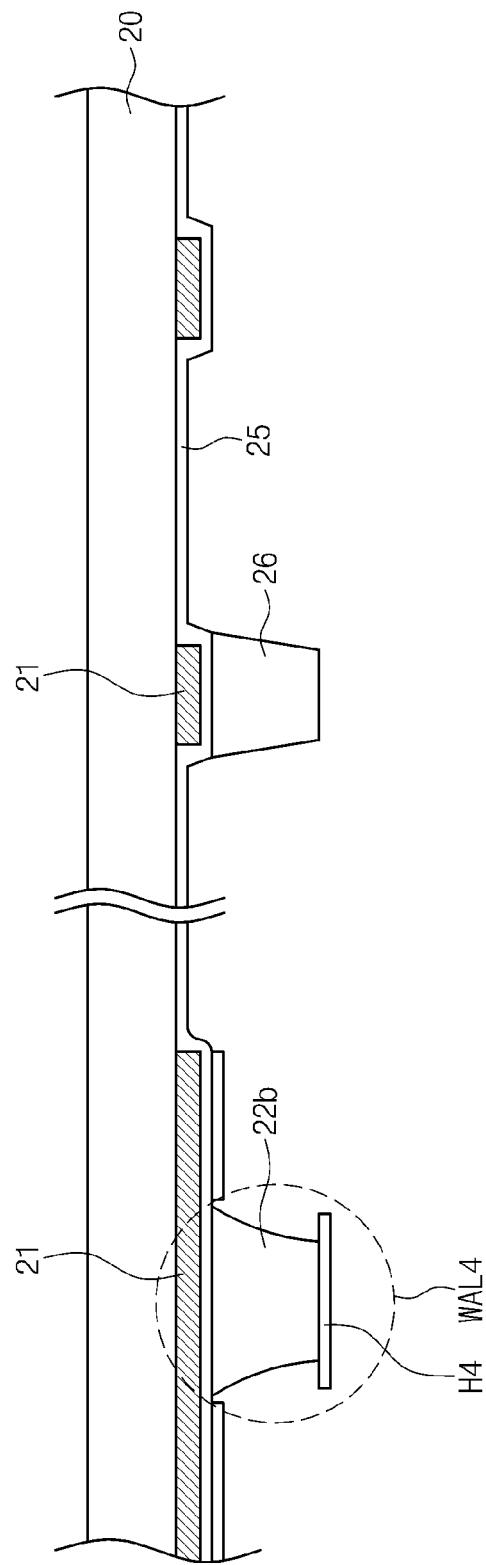
FIG. 8 is a cross-sectional view showing a second display substrate according to an embodiment of the present disclosure.

FIG. 8 is a cross-sectional view showing a second display substrate according to an embodiment of the present disclosure.

Referring to FIG. 8, a second display substrate 20 includes a light blocking layer 21, a common electrode 25, and a column spacer 26. The light blocking layer 21 may be disposed in a non-effective display area of the display area of the second display substrate 20 and the peripheral area surrounding the display area. In addition, the common electrode 25 may be integrally formed as a single unitary and individual unit over the second display substrate 20. The column spacer 26 is disposed in the non-effective display area to uniformly maintain a distance between the first and second display substrates 10 and 20.

Meanwhile, a fourth partition wall WAL4 is disposed on the second display substrate 20 to correspond to the peripheral area. The fourth partition wall WAL4 includes a fourth body 22b formed together with the column spacer 26 and a fourth holding part H4 that covers the upper surface of the fourth body 22b. That is, the fourth body 22b may be formed of the same material as the column spacer 26.

Although not shown in figures, the third partition wall WAL3 (shown in FIG. 6) disposed outward than the fourth wall WAL4 may be formed together with the column spacer 26 as the fourth partition wall WAL4.

Figure 9:
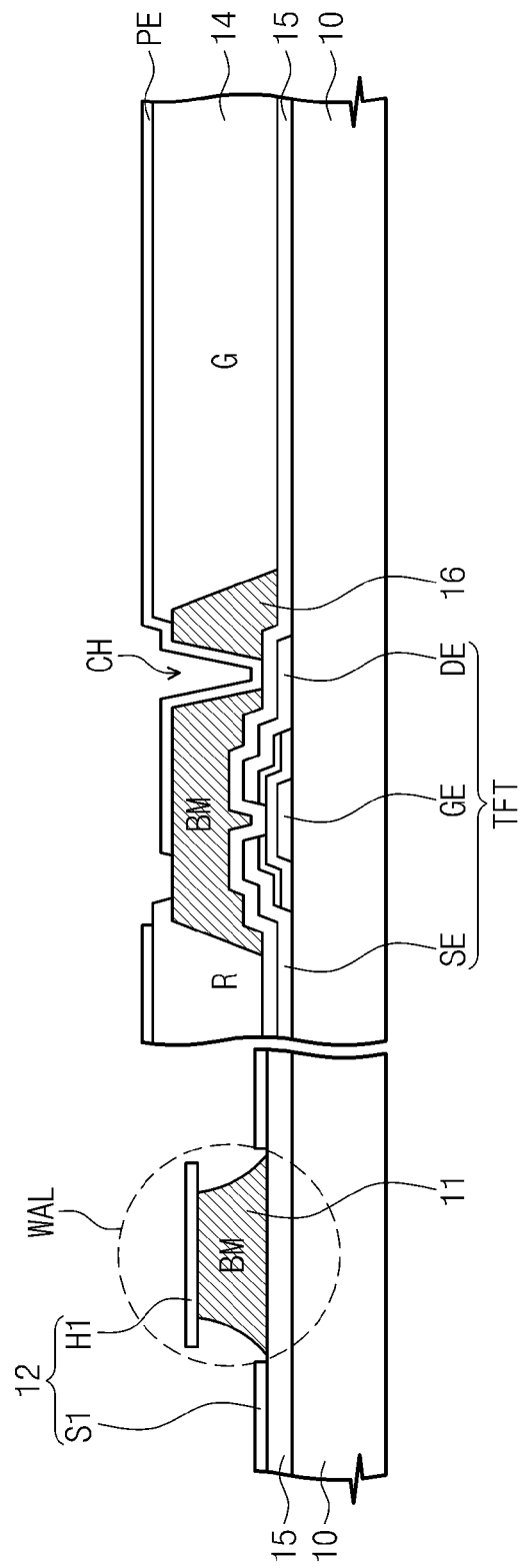
FIG. 9 is a cross-sectional view showing a first display substrate according to an embodiment of the present disclosure.

FIG. 9 is a cross-sectional view showing a first display substrate according to an embodiment of the present disclosure. In FIG. 9, the same reference numerals denote the same elements in FIG. 7, and thus detailed descriptions of the same elements will be omitted.

Referring to FIG. 9, a light blocking layer 16 according to an embodiment is disposed on the first display substrate 10 to cover components disposed in the non-effective display area, such as, for example, the thin film transistor TFT.

In this case, a partition wall WAL, which is disposed in the peripheral area of the first display substrate 10 to prevent the first alignment solution 13 from spreading out, includes a body 11 formed of a black matrix BM used to form the light blocking layer 16 and a holding part H1 that covers the upper surface of the body 11.

Although not shown in figures, a planarization organic layer disposed on the first display substrate 10 may be applied to the body 11 of the partition wall WAL.

FIGS. 10A to 10D are views showing a process of forming the partition wall formed on the first display substrate according to an embodiment of the present disclosure.

Figure 10A:
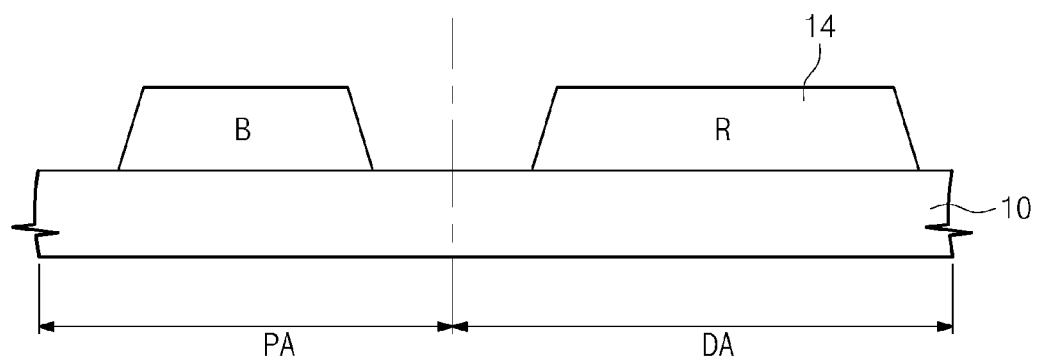
FIGS. 10A to 10D are views showing a process of forming a partition wall formed on a first display substrate according to an embodiment of the present disclosure.

Referring to FIG. 10A, the color pixel, such as, for example, red color pixel R, of the color filter layer 14 is formed in the display area DA of the first display substrate 10, and the color pixel, such as, for example, blue color pixel B used as the body 11 of the partition wall WAL, is formed in the peripheral area PA.

For the convenience of explanation, layers disposed between the first display substrate 10 and the color filter layer 14 are not shown in FIG. 10A.

Figure 10B:
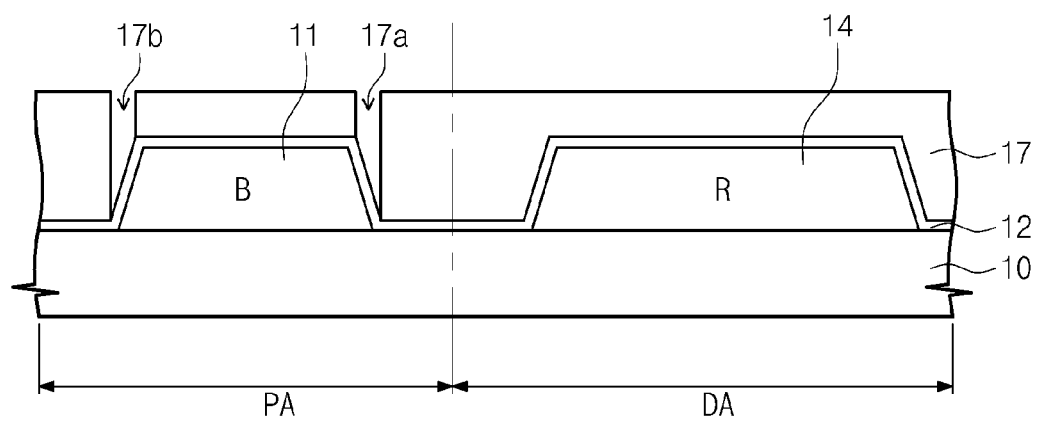

As shown in FIG. 10B, the capping layer 12 may be formed on the body 11 and the color filter layer 14. As an example, the capping layer 12 may include silicon nitride or silicon oxide.

A photoresist layer is formed on the capping layer 12. The photoresist layer is patterned using a mask, and thus first and second opening patterns 17a and 17b are formed through the body 11 to respectively correspond to both ends of the body 11.

Figure 10C:
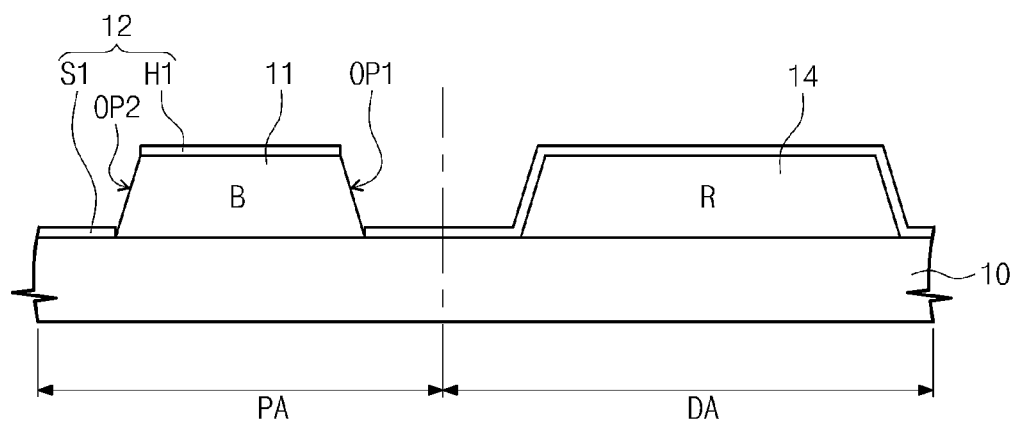
Figure 10D:
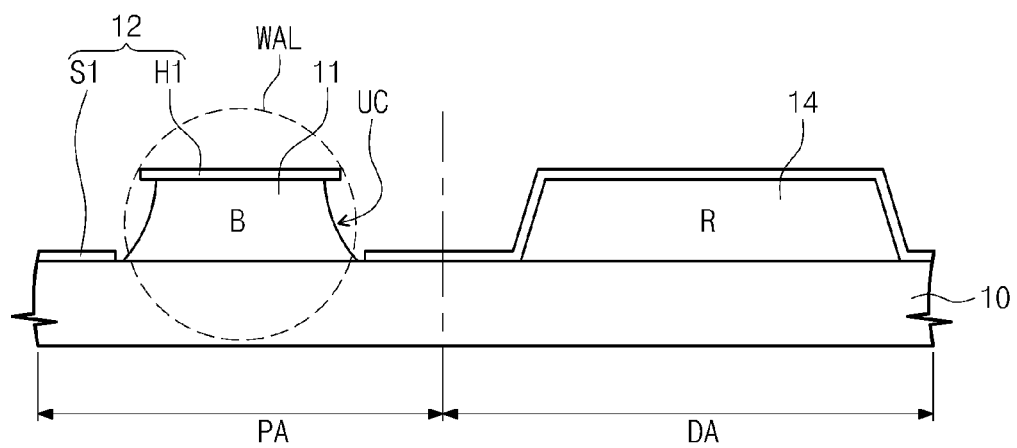

Then, when the capping layer 12 is dry-etched, the capping layer 12 is removed from the both ends of the body 11 through the first and second opening patterns 17a and 17b and first and second openings OP1 and OP2 are formed to respectively expose both ends of the body 11 as shown in FIG. 10C. Therefore, the capping layer 12 is divided into the holding part H1 formed on the upper surface of the body 11 and the stacking layer Si formed in a remaining area except for the upper surface of the body 11 by the first and second openings OP1 and OP2.

When both ends of the body 11, which are respectively exposed through the first and second openings OP1 and OP2, are wet-etched, the upper surface of the body 11 has a width smaller than that of the holding part H1, and the undercut UC is formed at both side portions of the body 11.

As described above, since the surface contact angle θ of the alignment solution 13 disposed on the holding part H1 is varied depending on the angle of the undercut UC, the condition of the wet etching process may be controlled to allow the undercut UC to be formed at a desired angle.

Although certain embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display panel comprising:
   a first display substrate;
   a second display substrate configured to face the first display substrate and be coupled to the first display substrate;
   a liquid crystal layer configured to be interposed between the first display substrate and the second display substrate;
   an alignment layer configured to be disposed in a display area of at least one of the first and second display substrates; and
   a partition wall configured to be disposed in a peripheral area surrounding the display area of the at least one of the first and second display substrates, the partition wall comprising:
   a body, wherein an undercut is formed at a side portion of the body, and
   a capping layer configured to cover an upper surface of the body, wherein a width of the upper surface of the body is smaller than a width of the capping layer, wherein the capping layer includes a holding part disposed on the upper surface of the body, and a stacking part disposed on the at least one of the first and second display substrates, and wherein the holding part and the stacking part are disconnected from each other in an area in which the undercut is formed.

2. The display panel of claim 1, wherein the capping layer includes a protrusion outward from the upper surface of the body and a width of the protrusion is equal to or smaller than about 2 micrometers.

3. The display panel of claim 1, wherein a surface contact angle θ of an alignment solution on the capping layer satisfies the following Equation, $$\theta_0 \leq \theta \leq (180° - \phi) + \theta_0,$$

where $\theta_0$ denotes the surface contact angle of the alignment solution on a flat plate, and $\phi$ denotes an included angle between the capping layer and the side portion of the body.

4. The display panel of claim 3, wherein at least one of a color filter layer, a column spacer, and a light blocking layer is disposed in the display area, and the body of the partition wall is formed by one of the at least one of the color filter layer, the column spacer, and the light blocking layer.

5. The display panel of claim 4, wherein the body comprises a photosensitive organic material.

6. The display panel of claim 1, wherein the capping layer comprises at least one of a silicon nitride or a silicon oxide.

7. The display panel of claim 1, wherein the partition wall comprises:
   a lower partition wall disposed on the first display substrate; and
   an upper partition wall disposed on the second display substrate,
   wherein the lower partition wall and the upper partition wall are dislocated from each other.

8. The display panel of claim 1, further comprising a seal configured to be interposed between the first display substrate and the second display substrate to couple the first display substrate and the second display substrate to each other.

9. The display panel of claim 8, wherein the peripheral area comprises a sealing area in which the seal is disposed, and the partition wall comprises:
   a first partition wall disposed in the sealing area to overlap with the seal; and
   a second partition wall disposed between the sealing area and the display area.

* * * * *